(12) United States Patent
Kwon et al.

(10) Patent No.: US 7,939,194 B2
(45) Date of Patent: May 10, 2011

(54) CAN TYPE SECONDARY BATTERY

(75) Inventors: Teak Hyen Kwon, Gangwon-do (KR); Young Jun Kim, Kyunggi-do (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1174 days.

(21) Appl. No.: 11/223,437

(22) Filed: Sep. 9, 2005

(65) Prior Publication Data

US 2006/0057459 A1   Mar. 16, 2006

(30) Foreign Application Priority Data

Sep. 9, 2004   (KR) ................. 10-2004-0072325

(51) Int. Cl.
 *H01M 2/14* (2006.01)
(52) U.S. Cl. .................. 429/129; 429/133; 429/247
(58) Field of Classification Search .................. None
See application file for complete search history.

(56) References Cited

U.S. PATENT DOCUMENTS

| | | | | |
|---|---|---|---|---|
| 6,117,586 A * | 9/2000 | Kim et al. | ..................... | 429/175 |
| 2004/0115521 A1 | 6/2004 | Cho | | |

FOREIGN PATENT DOCUMENTS

| | | |
|---|---|---|
| JP | 07-335274 | 12/1995 |
| JP | 2002-93387 | 3/2002 |
| JP | 2003-317678 | 11/2003 |
| JP | 2004-103579 | 4/2004 |
| JP | 2004-119383 | 4/2004 |
| KR | 10-2003-0066243 | 8/2003 |
| KR | 10-2005-0049835 | 5/2005 |

OTHER PUBLICATIONS

The definition of "between" as defined by www.m-w.com: http://www.merriam-webster.com/dictionary/between <retrived on Jul. 17, 2010>.*
Patent Abstracts of Japan, Publication No. 2003-317678; Publication Date: Jul. 11, 2003; in the name of Minami et al.
Office action dated Apr. 8, 2009 for corresponding Japanese Patent Application No. 2005-239183. JP 2004-119383 was cited in an IDS dated Apr. 23, 2009, and JP 2003-317678 was cited in an IDS dated Apr. 20, 2006.

* cited by examiner

*Primary Examiner* — Patrick Ryan
*Assistant Examiner* — Cynthia Lee
(74) *Attorney, Agent, or Firm* — Christie, Parker & Hale, LLP (57) ABSTRACT

A can type secondary battery. The can type secondary battery has a fixing unit for fixing an end portion of a terminal plate to an end portion of an insulation plate of a cap assembly in order to prevent a short circuit between the terminal plate and an electrode assembly by preventing the terminal plate from being deformed due to external force or external pressure applied to the can type secondary battery, thereby improving safety of the secondary battery.

18 Claims, 7 Drawing Sheets

FIG. 1

RELATED ART

CAN TYPE SECONDARY BATTERY

CROSS REFERENCE TO RELATED APPLICATION

This application claims priority to and the benefit of Korea Patent Application No. 10-2004-0072325 filed on Sep. 9, 2004, in the Korean Intellectual Property Office, the entire content of which is incorporated herein by reference.

BACKGROUND OF THE INVENTION

1. Field of the Invention

The present invention relates to a can type secondary battery, and more particularly to a can type secondary battery having a fixing unit which improves the safety of the secondary battery.

2. Description of the Prior Art

As portable wireless appliances such as video cameras, portable phones, and portable computers have become more compact and lightweight with high-grade functions, various studies are being carried out in relation to secondary batteries which are used as power sources for such portable wireless appliances. Secondary batteries include Ni—Cd batteries, Ni-MH batteries, Ni—Zn batteries and lithium secondary batteries. Among other things, lithium secondary batteries are rechargeable batteries fabricated in a small size with high capacity. The lithium secondary batteries represent high operational voltage and high energy density per unit weight, so lithium secondary batteries are extensively used in advanced electronic technology fields.

Figure 1:
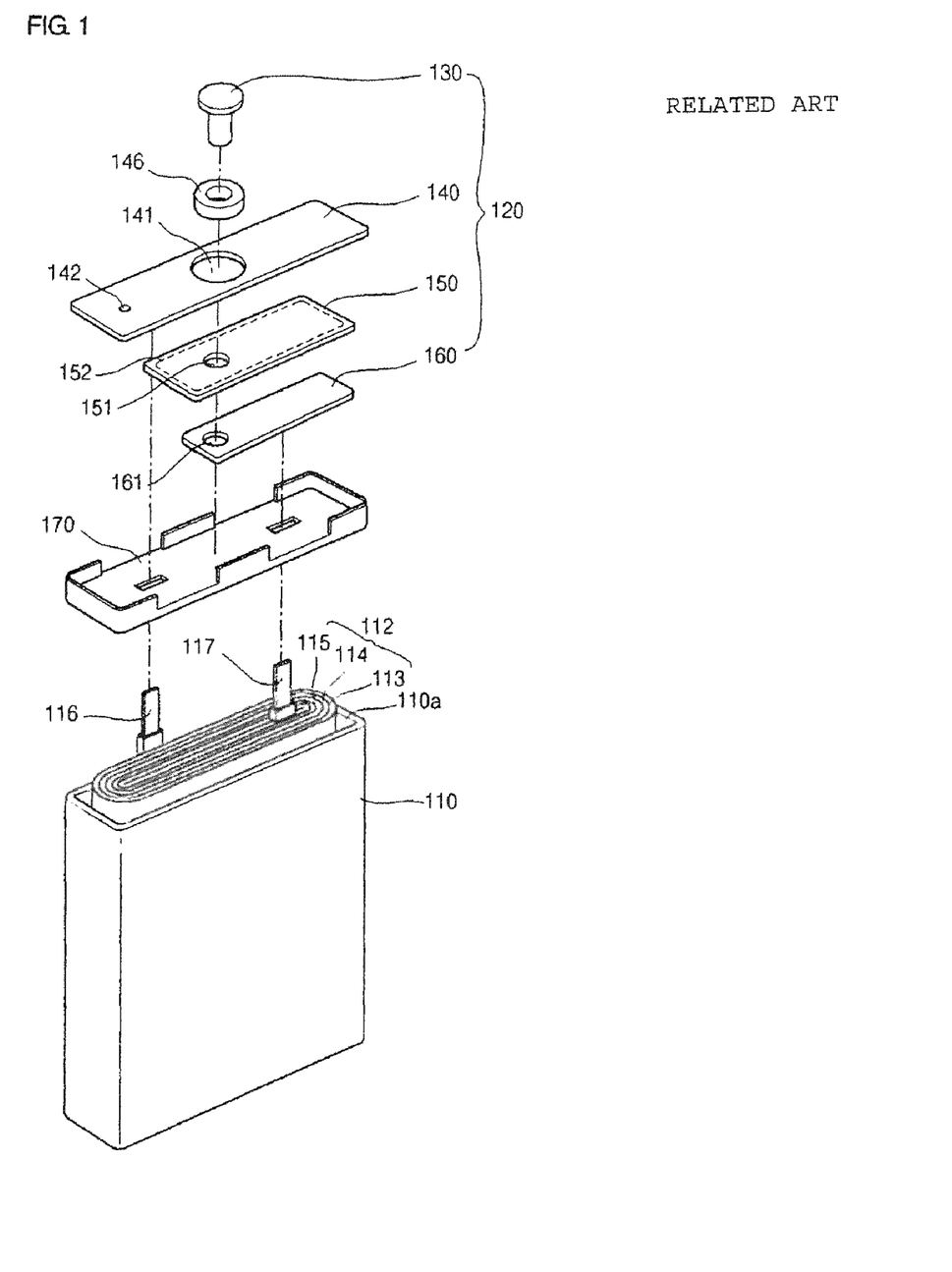
FIG. 1 is an exploded perspective view of a conventional can type secondary battery.

FIG. 1 is an exploded perspective view illustrating a conventional can type lithium ion secondary battery.

According to the conventional can type lithium ion secondary battery, an electrode assembly 112 including a second electrode plate 113, a first electrode plate 115 and a separator 114 is accommodated in a can 110 together with an electrolyte. An upper opening section 110a of the can 110 is sealed by means of a cap assembly 120.

The cap assembly 120 includes a cap plate 140, an insulation plate 150, a terminal plate 160 and an electrode terminal 130. The cap assembly 120 is accommodated in an insulation case 170 and is coupled to the upper opening section 110a of the can 110 to seal the can 110.

The cap plate 140 is a metal plate having a size and a shape corresponding to the upper opening section 110a of the can 110. The cap plate 140 has formed a first terminal hole 141 at its center having a predetermined size into which the electrode terminal 130 is insertable. A gasket tube 146 is coupled around the electrode terminal 130 in order to insulate the electrode terminal 130 from the cap plate 140 when the electrode terminal 130 is inserted into the first terminal hole 141. In addition, an electrolyte injection hole 142 having a predetermined size is formed at one side of the cap plate 140. After the cap assembly 120 has been assembled with the upper opening section 110a of the can 110, the electrolyte is injected into the can 110 through the electrolyte injection hole 142. Then, the electrolyte injection hole 142 is sealed by means of a sealing member.

The electrode terminal 130 is connected to a first electrode tap 117 of the first electrode plate 115 or a second electrode tap 116 of the second electrode plate 113 in such a manner that the electrode terminal 130 may act as a first electrode terminal or a second electrode terminal.

The first electrode plate 115 may be used as a positive electrode plate or a negative electrode plate. Additionally, the second electrode plate 113 may also be used as a negative electrode or a positive electrode plate.

The insulation plate 150 may be made from insulative material substantially similar to the material used for a gasket and coupled to a bottom surface of the cap plate 140. The insulation plate 150 may be formed at a predetermined portion thereof with a second terminal hole 151, which corresponds to the first terminal hole 141 of the cap plate 140. The electrode terminal 130 may extend through the second terminal hole 151 of the insulation plate 150. In addition, the insulation plate 150 may have a bottom surface formed with a resting groove 152 having a size corresponding to a size of the terminal plate 160 in such a manner that the terminal plate 160 can be stably rested in the resting groove 152.

The terminal plate 160 is made from a Ni-alloy and is coupled to the bottom surface of the insulation plate 150. The terminal plate 160 includes a third terminal hole 161 corresponding to the first terminal hole 141 of the cap plate 140. Since the electrode terminal 130 may extend through the third terminal hole 161 of the terminal plate 160 while being insulated from the terminal plate 160 by the gasket tube 146, the terminal plate 160 may be electrically insulated from the cap plate 140 and may be electrically connected to the electrode terminal 130.

However, in such a lithium secondary battery, voltage may suddenly rise if an internal short circuit, an external short circuit or overcharge/over-discharge of the electrode assembly occurs. In this case, the lithium secondary battery may cease to function. In order to prevent the secondary battery from short circuiting, insulative tapes are attached not only to end portions of a positive electrode plate and a negative electrode plate of the electrode assembly, but also to a welding section of an electrode tap. In addition, the secondary battery is electrically connected to safety devices, such as a positive temperature coefficient (PTC) element, a thermal fuse and a protecting circuit. Such safety devices may shut off current when the voltage or temperature of the secondary battery suddenly rises, thereby preventing the secondary battery from being broken or damaged.

If the lithium ion secondary battery is deformed due to external impact or external pressure applied thereto, the protective circuit or the protective device may not be able to prevent a short circuit between electrodes. According to a longitudinal compression evaluation method, which is one of the methods for evaluating the safety of the can-type secondary battery, the short circuit between the electrode plates within the can-type secondary battery is a problem. In a longitudinal compression test, which is one of the items for evaluating the safety of the can-type secondary battery, a compression jig is used to compress both lateral surfaces of the can-type secondary battery in a direction perpendicular to the longitudinal direction of the can-type secondary battery. During the compression, the compression surfaces of the compression jig remain parallel to both lateral surfaces of the can-type secondary battery and the compression force is 13 kN. As the can-type secondary battery is compressed according to the longitudinal compression evaluation method, the first and second electrode plates are short-circuited and currents flow abruptly from the second electrode plate to the first electrode plate. As a result, excessive heat is generated by the first and second electrode plates' own resistance. The excessive heating may cause the second battery to explode.

In addition, if the secondary battery is pressed in a longitudinal direction or if a downward external force is applied to the secondary battery from the upper end of the cap assembly, the terminal plate coupled to the bottom surface of the cap assembly may separate from the insulation plate and bend towards the electrode assembly, thereby causing a short circuit between the second electrode plate and the first electrode plate. Therefore, the safety of the secondary battery may be reduced.

SUMMARY OF THE INVENTION

A can type secondary battery is provided having a fixing unit for fixing an end portion of a terminal plate to an end portion of an insulation plate of a cap assembly in order to prevent a short circuit between the terminal plate and an electrode assembly by preventing the terminal plate from being deformed due to external force or external pressure applied to the can type secondary battery, thereby improving safety of the secondary battery.

The can type secondary battery includes an electrode assembly having a first electrode plate, a second electrode plate and a separator; a can for receiving the electrode assembly and an electrolyte therein; a cap assembly including a cap plate, an insulation plate, an electrode terminal and a terminal plate and being coupled with an upper opening section of the can in order to seal the can; and a fixing unit for fixing the terminal plate coupled to a bottom surface of the insulation plate, wherein the insulation plate is formed at a first side thereof with a terminal hole into which the electrode terminal is inserted and the fixing unit is provided at a second side of the insulation plate opposite the terminal hole.

According to an exemplary embodiment of the present invention, the insulation plate is formed at the bottom surface thereof with a resting groove for receiving the terminal plate therein, and the fixing unit includes a plate having a predetermined width and being provided at an upper portion of the resting groove at the second end of the insulation plate.

The insulation plate has a flat plate shape and the fixing unit has a cap shape, the fixing unit being provided at one end portion of the insulation plate with a predetermined width, one end portion of the terminal plate is inserted into the cap-shaped fixing unit so that the fixing unit fixes the terminal plate.

The fixing unit is integrally formed with the insulation plate or coupled to the end portion of the insulation plate by welding or an adhesive.

The width of the fixing unit is about 20% of the length of the insulation plate.

In one exemplary embodiment, the width of the fixing unit is about 20% of the length of the terminal plate.

The insulation plate has a resting groove on its bottom surface for receiving the terminal plate, and the fixing unit has a bar shape and is provided at a predetermined portion of the insulation plate over the width of the insulation plate.

A distance between the fixing unit and one end portion of the insulation plate is about 20% of the length of the insulation plate.

In one exemplary embodiment, the distance between the fixing unit and one end portion of the terminal plate is about 20% of the length of the terminal plate.

The fixing unit may include a V-shaped bar coupled to both long lateral sections and one short lateral section of the insulation plate at a predetermined end portion of the insulation plate.

A distance between end portions of the fixing unit coupled to both long lateral sections of the insulation plate and one end portion of the insulation plate is about 20% of the length of the insulation plate.

In one exemplary embodiment, the distance between end portions of the fixing unit coupled to both long lateral sections of the insulation plate and one end portion of the insulation plate is about 20% of the length of the terminal plate.

In another exemplary embodiment of the present invention, an insulation plate assembly for a cap assembly for a can type secondary battery is provided. The insulation plate assembly includes a fixing unit, the fixing unit fixing a terminal plate coupled to a bottom surface of the insulation plate, wherein the insulation plate has a terminal hole formed through a first surface thereof through which an electrode terminal is insertable.

BRIEF DESCRIPTION OF THE DRAWINGS

FIG. 3b is a sectional view taken along line A-A shown in FIG. 3a.

FIG. 4b is a sectional view taken along line B-B shown in FIG. 4a.

FIG. 5b is a sectional view taken along line C-C shown in FIG. 5a.

DETAILED DESCRIPTION

Figure 2:
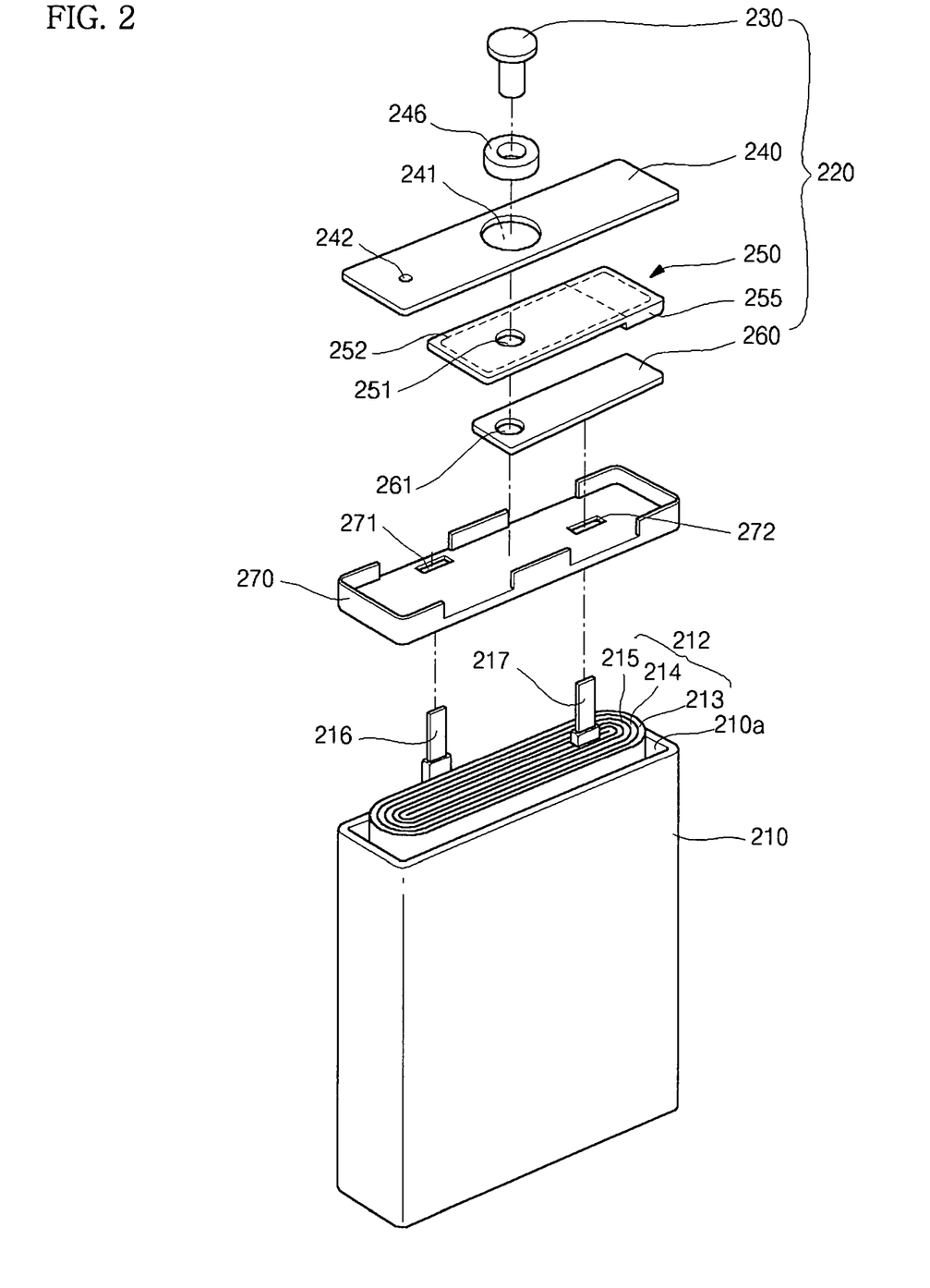
FIG. 2 is an exploded perspective view of a can type secondary battery according to one embodiment of the present invention.

Referring to FIG. 2, a can type secondary battery according to an exemplary embodiment of the present invention includes a can 210, an electrode assembly 212 accommodated in the can 210, and a cap assembly 220 coupled to the can 210 in such a manner that an upper opening section 210a of the can 210 is sealed by means of the cap assembly 220. In addition, a fixing unit 255 is formed in an insulation plate 250 of the cap assembly 220 in order to prevent a terminal plate 260 of the cap assembly 220 from being deformed.

The can 210 has a substantially hexahedronal shape and may be made from a lightweight, soft, flexible material such as aluminum or an aluminum alloy. However, the present invention is not limited to these materials for the can 210. An upper surface of the can 210 is opened, thereby forming the upper opening section 210a. The electrode assembly 212 is accommodated in the can 210 through the upper opening section 210a.

The electrode assembly 212 includes a second electrode plate 213, a first electrode plate 215 and a separator 214. The second electrode plate 213 is stacked on the first electrode plate 215 by interposing the separator 214 therebetween.

Then, the stack structure is wound into a jelly-roll configuration. The second electrode plate 213 is formed with a positive electrode oxide layer including lithium oxide and the first electrode plate 215 is formed with a first electrode oxide layer including carbon material. A second electrode tap 216 is welded to the second electrode plate 213 and an end portion of the second electrode tap 216 protrudes upwards out of the electrode assembly 212. In addition, a first electrode tap 217 is welded to the first electrode plate 215 and an end portion of the first electrode tap 217 also protrudes out of the electrode assembly 212.

The cap assembly 220 includes a cap plate 240, the insulation plate 250, the terminal plate 260 and an electrode terminal 230. The cap assembly 220 is accommodated in an insulation case 270 and coupled to the upper opening section 210a of the can 210 so that the cap assembly 220 seals the can 210 while being insulated from the electrode assembly 212.

The cap plate 240 is a metal plate having a size and a shape corresponding to the upper opening section 210a of the can 210. The cap plate 240 may be made from aluminum or an aluminum alloy having light weight. The cap plate 240 may have a first terminal hole 241 at its center having a predetermined size. An electrolyte injection hole 242 is formed at one side of the cap plate 240. The electrode terminal 230 is inserted into the first terminal hole 241. A gasket tube 246 may be installed in the first terminal hole 241 in order to insulate the electrode terminal 230 from the cap plate 240.

The electrolyte injection hole 242 having a predetermined size is formed at one end portion of the cap plate 240. After the cap assembly 220 has been assembled with the upper opening section 210a of the can 210, the electrolyte is injected into the can 210 through the electrolyte injection hole 242. Then, the electrolyte injection hole 242 is sealed by means of a sealing member.

The insulation plate 250 may be made from insulative material substantially similar to the material used for a gasket. The insulation plate 250 may have a resting groove 252 formed on its bottom surface for accommodating the terminal plate 260 therein. In addition, the insulation plate 250 may have a second terminal hole 251 on a first side which is positioned so that it corresponds to the first terminal hole 241 of the cap plate 240 when the insulation plate 250 is coupled with the cap plate 240. The electrode terminal 230 may extend through the second terminal hole 251 of the insulation plate 250.

The insulation plate 250 may also have a welding slot 253 (FIG. 3a) formed on a lateral section thereof which is positioned corresponding to a welding section for the first electrode tap 217 in such a manner that the first electrode tap 217 can be easily guided into the welding section.

The fixing unit 255 is formed at one end of the bottom surface of the insulation plate 250 in order to fix one end portion of the terminal plate 260, which is provided opposite to a third terminal hole 261 formed in the terminal plate 260. The fixing unit 255 will be described in detail below.

The terminal plate 260 may be made from a Ni-alloy and is rested in the resting groove 252 of the insulation plate 250. The terminal plate 260 is formed at a predetermined portion thereof with the third terminal hole 261 corresponding to the first terminal hole 241 of the cap plate 240. The terminal electrode 230 is inserted into the third terminal hole 261 of the terminal plate 260 so that the terminal plate 260 is electrically connected to the terminal electrode 230.

The insulation case 270 includes a second electrode tap hole 271 and a first electrode tap hole 272 and is coupled to the bottom surface of the cap assembly 220 so as to electrically insulate the cap assembly 220 from the electrode assembly 212. The second electrode tap 216 is connected to the cap plate 240 through the second electrode tap hole 271. In addition, the first electrode tap 217 is connected to the terminal plate 260 through the first electrode tap hole 272.

Figure 3A:
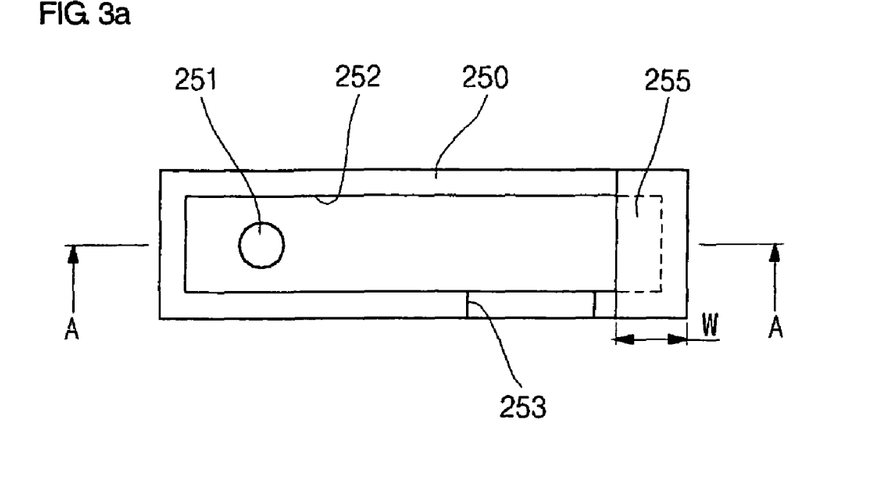
FIG. 3a is a bottom view of an insulation plate equipped with a fixing unit according to one embodiment of the present invention.
Figure 3B:
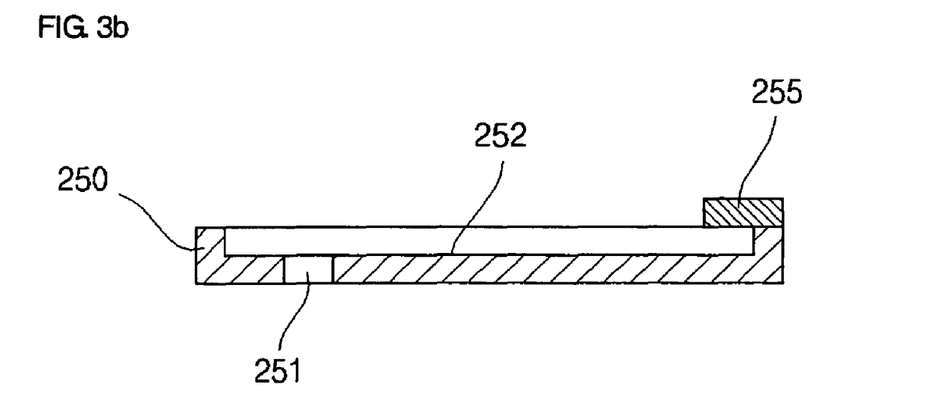

Referring to FIGS. 3a and 3b, the fixing unit 255 has a plate shape having a predetermined width and is formed at an upper portion of the resting groove 252 opposite to the second terminal hole 251 of the insulation plate 250. This allows the fixing unit 255 to fix one end portion of the terminal plate 260 rested in the resting groove 252 formed in the bottom surface of the insulation plate 250. The width of the fixing unit 255 may be about 20% of the length of the insulation plate 250. In one exemplary embodiment, the width of the fixing unit 255 is about 20% of the length of the terminal plate 260. That is, the fixing unit 255 makes contact with about 20% of the length of the terminal plate 260 so as to fix the terminal plate 260. If the width of the fixing unit 255 exceeds 20% of the length of the insulation plate 250, the welding section for the first electrode tap 217 formed at the bottom surface of the terminal plate 260 may be reduced, making it difficult to weld the first electrode tap 217 to the welding section.

In one exemplary embodiment, the fixing unit 255 may be integrally formed with the insulation plate 250. In this case, the coupling force between the fixing unit 255 and the insulation plate 250 may be increased so that the fixing unit 255 can securely fix the terminal plate 260. However, if the fixing unit 255 is integrally formed with the insulation plate 250, a process for fabricating the insulation plate 250 may be complicated.

Alternately, the fixing unit 255 may be fabricated separately from the insulation plate 250 such that the fixing unit 255 may be coupled to the insulation plate 250 by welding or by an adhesive. In this case, the fixing unit 255 may be easily formed. If the fixing unit 255 is coupled to the insulation plate 250 by means of an adhesive, the adhesive may have a resistance to the electrolyte used for the secondary battery. For instance, a polyimide-based adhesive may be used for coupling the fixing unit 255 to the insulation plate 250.

Figure 4A:
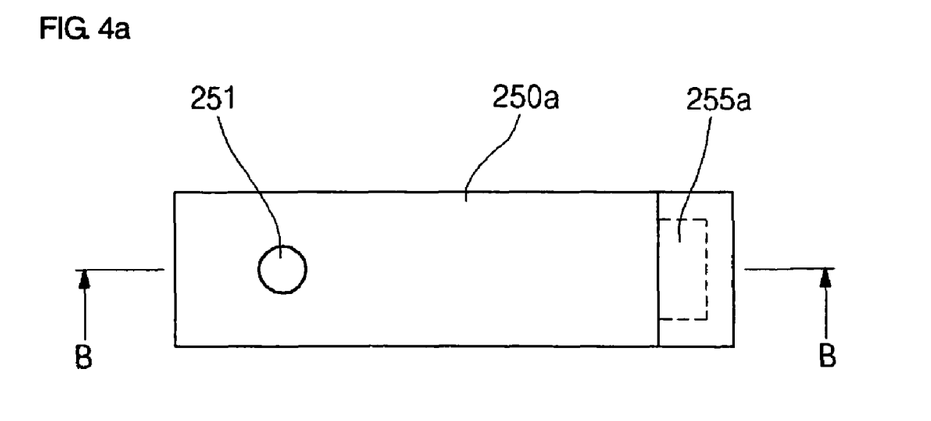
FIG. 4a is a bottom view of an insulation plate equipped with a fixing unit according to another embodiment of the present invention.
Figure 4B:
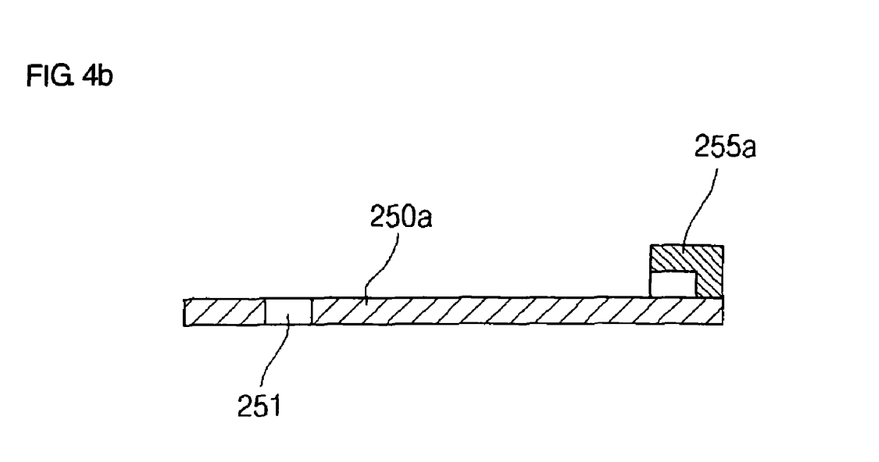

FIG. 4a is a bottom view of an insulation plate 250a equipped with a fixing unit 255a according to another embodiment of the present invention, and FIG. 4b is a sectional view taken along line B-B shown in FIG. 4a.

Referring to FIGS. 4a and 4b, the fixing unit 255a having a cap shape is provided at one end portion of the insulation plate 250a having a substantially flat plate shape without a resting groove. The fixing unit 255a fixes the end portion of the terminal plate 260, which is inserted into the cap-shaped fixing unit 255a. As mentioned above, the fixing unit 255a may be integrally formed with the insulation plate 250a or may be coupled to the bottom surface of the insulation plate 250a by means of welding or by an adhesive.

Figure 5A:
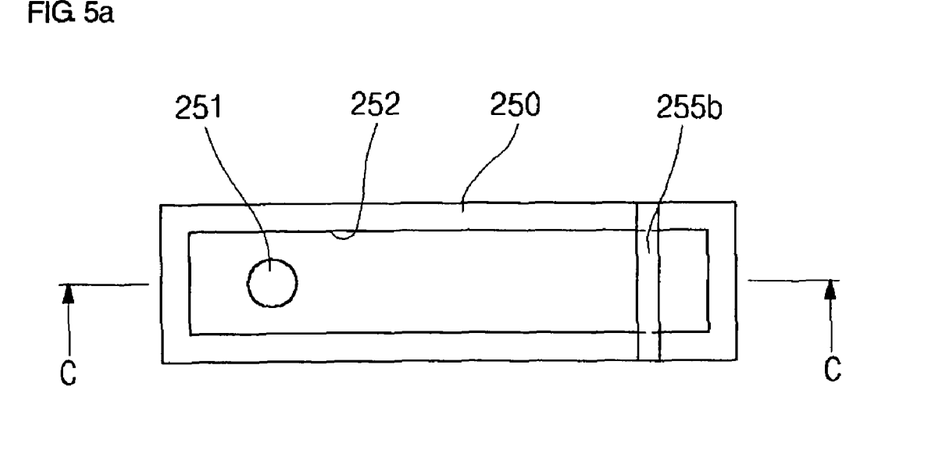
FIG. 5a is a bottom view of an insulation plate equipped with a fixing unit according to still another embodiment of the present invention.
Figure 5B:
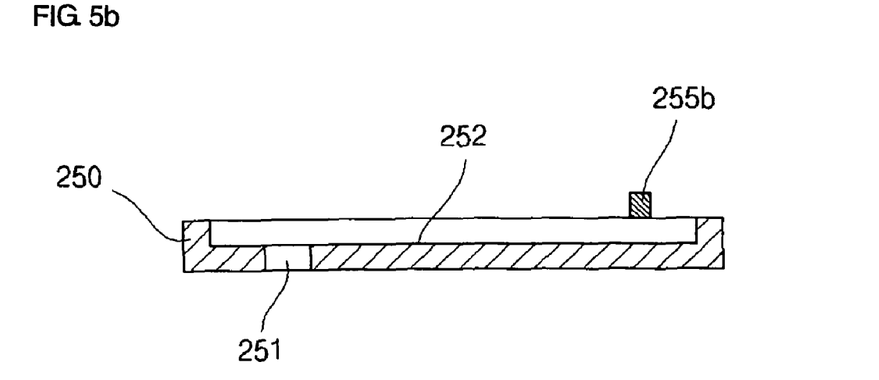

FIG. 5a is a bottom view of an insulation plate 250 equipped with a fixing unit 255b according to still another embodiment of the present invention and FIG. 5b is a sectional view taken along line C-C shown in FIG. 5a.

Referring to FIGS. 5a and 5b, the fixing unit 255b has a bar shape having a predetermined width and length. The fixing unit 255b is provided at a predetermined portion of the insulation plate 250 over the whole width of the insulation plate 250 in order to fix one end portion of the terminal plate 260. The fixing unit 255b may be coupled to the bottom surface of the insulation plate 250 by welding or by an adhesive. A distance between the fixing unit 255b and one end portion of the insulation plate 250 is about 20% of the length of the insulation plate 250. In one exemplary embodiment, the distance between the fixing unit 255b and one end portion of the insulation plate 250 is about 20% of the length of the terminal plate 260. If the distance exceeds 20% of the length of the terminal plate 260, the welding section for the first electrode tap 217 formed at the bottom surface of the terminal plate 260 may be reduced, making it difficult to weld the first electrode tap 217 to the welding section.

Figure 6:
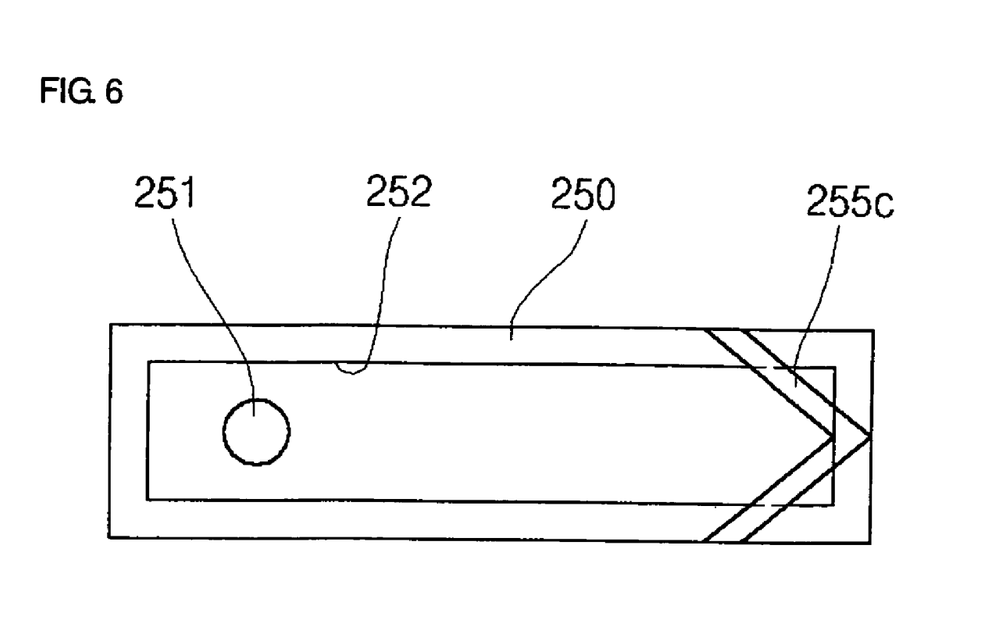
FIG. 6 is a bottom view of an insulation plate equipped with a fixing unit according to yet another embodiment of the present invention.

FIG. 6 is a bottom view of an insulation plate 250 equipped with a fixing unit 255c according to yet another embodiment of the present invention.

Referring to FIG. 6, the fixing unit 255c is a V-shaped bar coupled to both long lateral sections and one short lateral section of the insulation plate 250 at a predetermined end portion of the insulation plate 250 in order to fix one end portion of the terminal plate 260. The fixing unit 255c may be coupled to the bottom surface of the insulation plate 250 by welding or by an adhesive. If the fixing unit 255c is fabricated in the form of the V-shaped bar, a welding rod (not shown) used for welding the first electrode tap 217 to the welding section may easily access the terminal plate 260. At this time, a distance between end portions of the fixing unit 255b coupled to both long lateral sections of the insulation plate 250 and one end portion of the insulation plate 250 is about 20% of the length of the insulation plate 250. In one exemplary embodiment, the distance is about 20% of the length of the terminal plate 260. If the distance exceeds 20% of the length of the terminal plate 260, the welding section for the first electrode tap 217 formed at the bottom surface of the terminal plate 260 may be reduced, making it difficult to weld the first electrode tap 217 to the welding section.

Hereinafter, an operation of the can type secondary battery according to an embodiment of the present invention will be described with reference to FIGS. 7 and 8.

Figure 7:
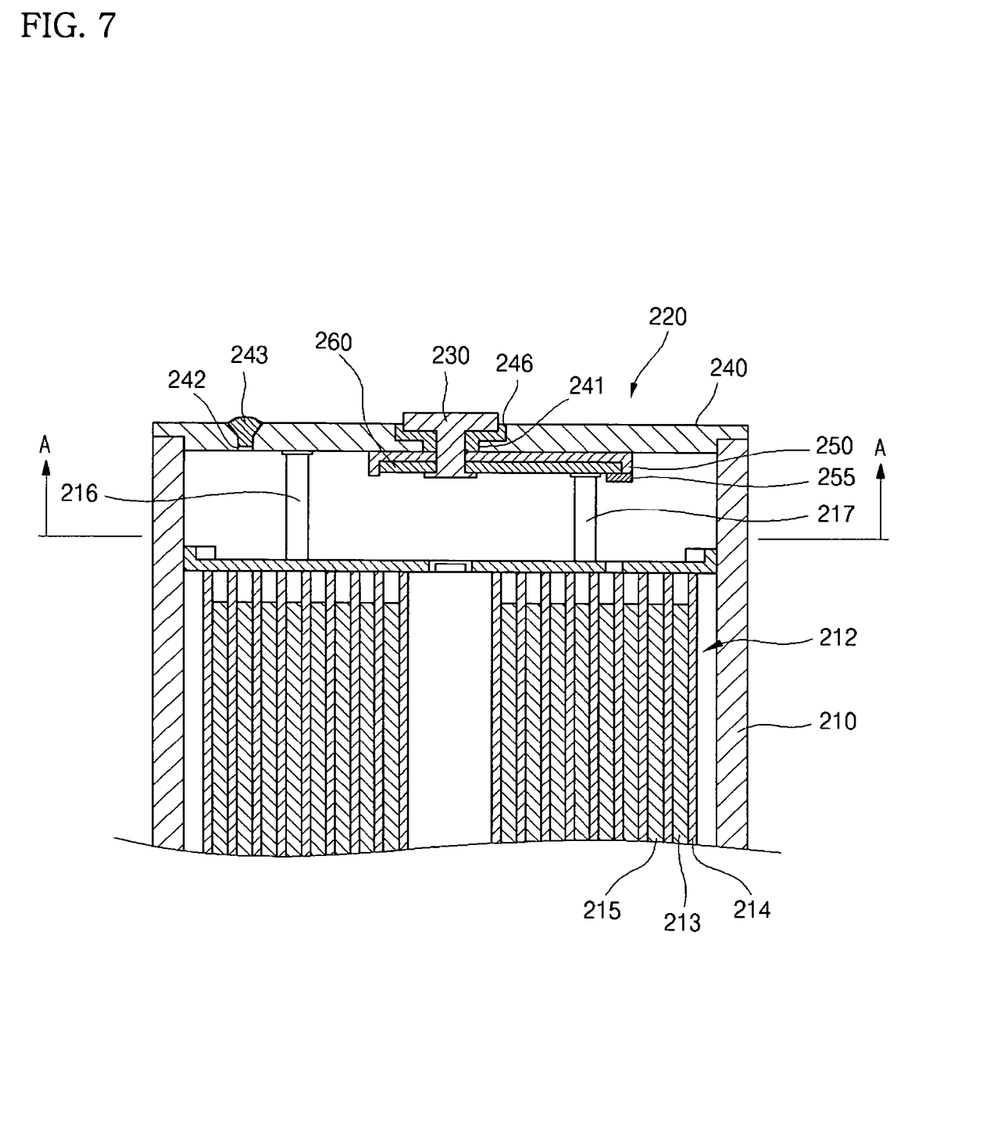
FIG. 7 is a sectional view illustrating an upper portion of a secondary battery having an insulation plate equipped with a fixing unit according to another embodiment of the present invention.
Figure 8:
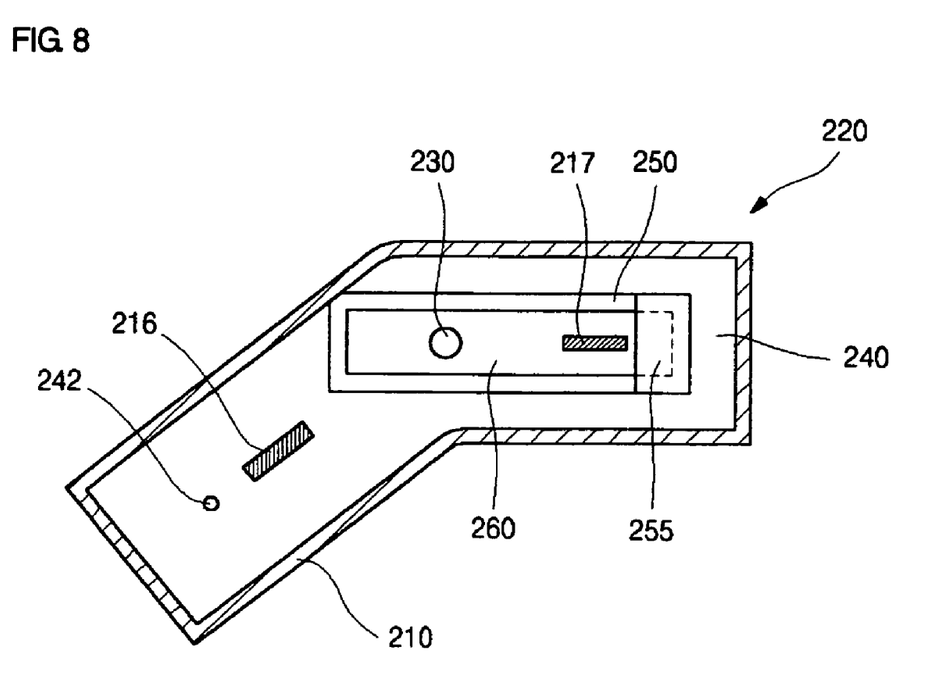
FIG. 8 is a sectional bottom view of a secondary battery shown in FIG. 7, which is deformed due to external pressure applied thereto in the longitudinal axis direction thereof.

FIG. 7 is a sectional view illustrating an upper portion of the secondary battery having the insulation plate equipped with the fixing unit according to one embodiment of the present invention and FIG. 8 is a sectional bottom view of the secondary battery shown in FIG. 7, which is deformed due to external pressure applied thereto in the longitudinal axis direction thereof.

Referring to FIG. 7, when the cap assembly 220 having the second electrode tap 216 and the first electrode tap 217 welded to the bottom surface of the cap assembly 220 is coupled with the upper opening section 210a of the can 210, the terminal plate 260 is spaced from an inner wall of the can 210 and the upper portion of the electrode assembly 212 by a predetermined distance so that terminal plate 260 is electrically insulated from the can 210 and the electrode assembly 212. In addition, the second electrode tap 216 is electrically insulated from the first electrode tap 217.

In this state, if the can 210 is deformed due to external pressure or external impact applied thereto in the longitudinal axis direction thereof, as shown in FIG. 8, the cap assembly 220 may be deformed about the electrode terminal 230 by a predetermined angle. At this time, since one side of the terminal plate 260 is fixedly connected to the electrode terminal 230 and the other side of the terminal plate 260 is fixed to the insulation plate 250 by means of the fixing unit 255, the terminal plate 260 may not be deformed in the direction vertical to the cap assembly 220. In addition, the first electrode tap 217 welded to the terminal plate 260 is not deformed in the direction of the electrode assembly 212 or the second electrode tap 216. Accordingly, the terminal plate 260 does not make contact with the electrode assembly 212 due to the fixing unit 255 so that the electrode assembly 212 is prevented from being damaged. Thus, a short circuit between the second electrode plate 213 and the first electrode plate 215 may be prevented by means of the fixing unit 255.

As described above, according to exemplary can type secondary batteries of the present invention, when the secondary battery is deformed due to external impact or external pressure applied to the secondary battery, the fixing unit may prevent the short circuit between the terminal plate and the electrode assembly by securely fixing the terminal plate, thereby improving safety of the can type secondary battery.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A can type secondary battery comprising:
   an electrode assembly including a first electrode plate, a second electrode plate and a separator;
   a can receiving the electrode assembly and an electrolyte therein;
   a cap assembly including a cap plate, an insulation plate, an electrode terminal and a terminal plate, the cap assembly being coupled to an upper opening section of the can to seal the can, the insulation plate having a terminal hole into which the electrode terminal is inserted; and
   a fixing unit comprising a first portion attached to a first surface of the insulation plate and a second portion spaced apart in a first direction from a second surface of the insulation plate, the first direction being perpendicular to the second surface,
   wherein a portion of the terminal plate is inserted in a space located between the second portion of the fixing unit and the second surface of the insulation plate and is covered in the first direction by the second portion of the fixing unit.

2. The can type secondary battery as claimed in claim 1, wherein the insulation plate has a groove formed therein for receiving the terminal plate, the second surface defining a base of the groove, and wherein the fixing unit comprises a plate having a width.

3. The can type secondary battery as claimed in claim 1,
   wherein the insulation plate comprises a flat plate and the fixing unit is coupled to the flat plate to form a cavity therebetween;
   wherein the fixing unit is at one end portion of the insulation plate and has a width;
   wherein the first and second surfaces of the insulation plate are a same surface of the flat plate; and
   wherein the portion of the terminal plate is inserted into the cavity.

4. The can type secondary battery as claimed in claim 2, wherein the fixing unit is integrally formed with the insulation plate.

5. The can type secondary battery as claimed in claim 2, wherein the first portion of the fixing unit is attached to the first surface of the insulation plate by welding or an adhesive.

6. The can type secondary battery as claimed in claim 2, wherein the width of the fixing unit is about 20% of a length of the insulation plate.

7. The can type secondary battery as claimed in claim 2, wherein the width of the fixing unit is about 20% of a length of the terminal plate.

8. The can type secondary battery as claimed in claim 1, wherein the insulation plate has a groove formed therein for receiving the terminal plate, the second surface defining a base of the groove, and wherein the fixing unit comprises a bar extending at a portion of the insulation plate over a width of the insulation plate.

9. The can type secondary battery as claimed in claim 8, wherein a distance between the fixing unit and one end portion of the insulation plate is about 20% of a length of the insulation plate.

10. The can type secondary battery as claimed in claim 8, wherein a distance between the fixing unit and one end portion of the terminal plate is about 20% of a length of the terminal plate.

11. The can type secondary battery as claimed in claim 1, wherein the fixing unit comprises a V-shaped bar.

12. The can type secondary battery as claimed in claim 11, wherein the V-shaped bar is coupled to two long lateral sections and one short lateral section of the insulation plate at an end portion of the insulation plate, and wherein a distance between end portions of the fixing unit coupled to the two long lateral sections of the insulation plate and the end portion of the insulation plate is about 20% of a length of the insulation plate.

13. The can type secondary battery as claimed in claim 11, wherein the V-shaped bar is coupled to two long lateral sections and one short lateral section of the insulation plate at an end portion of the insulation plate, and wherein a distance between end portions of the fixing unit coupled to the two long lateral sections of the insulation plate and the end portion of the insulation plate is about 20% of a length of the terminal plate.

14. An insulation plate assembly for a cap assembly for a can type secondary battery, the can type secondary battery including an electrode assembly and a can for receiving the electrode assembly and an electrolyte therein, the cap assembly including a cap plate, a terminal plate and an insulation plate, the insulation plate assembly comprising:

a fixing unit comprising a first portion attached to a first surface of the insulation plate and a second portion spaced apart in a first direction from a second surface of the insulation plate, the first direction being perpendicular to the second surface, wherein a portion of the terminal plate is insertable in a space located between the second portion of the fixing unit and the second surface of the insulation plate, the portion of the terminal plate being covered in the first direction by the second portion of the fixing unit when inserted in the space, and wherein the insulation plate has a terminal hole through which an electrode terminal is insertable.

15. The insulation plate assembly of claim 14, wherein the insulation plate has a groove formed therein for receiving the terminal plate, the second surface defining a base of the groove.

16. The insulation plate assembly of claim 14, wherein the fixing unit is integrally formed with the insulation plate.

17. The insulation plate assembly of claim 14, wherein the first portion of the fixing unit is attached to the first surface of the insulation plate by welding or by an adhesive.

18. The insulation plate assembly of claim 14, wherein the fixing unit comprises a V-shaped bar.

\* \* \* \* \*